United States Patent Office 3,850,936
Patented Nov. 26, 1974

3,850,936
INDOLE FUSED HETEROCYCLIC ANALGESIC
COMPOUNDS
David R. Herbst, Wayne, and Herchel Smith, Bryn Mawr, Pa., assignors to American Home Products Corporation, New York, N.Y.
No Drawing. Application May 19, 1970, Ser. No. 38,913, which is a continuation-in-part of abandoned application Ser. No. 889,867, Dec. 22, 1969, which is a continuation-in-part of abandoned application Ser. No. 839,629, July 7, 1969, which is a continuation-in-part of abandoned application Ser. No. 632,105, Apr. 19, 1967, which is a continuation-in-part of abandoned application Ser. No. 536,076, Feb. 21, 1966, which in turn is a continuation-in-part of abandoned application Ser. No. 428,842, Jan. 28, 1965. Divided and this application Aug. 10, 1972, Ser. No. 279,413
Int. Cl. C07d 39/12
U.S. Cl. 260—293.53
13 Claims

ABSTRACT OF THE DISCLOSURE

Substituted 2,3,5,6,11,11b - hexahydro-1$\underline{H}$ - indolizino-[8,7-$b$] indoles are prepared from appropriate 1,2,5,6,11,11b - hexahydro - 3$\underline{H}$ - indolizino[8,7-$b$]indol-3-ones. The products exhibit analgesic activity. The preparation of 1,2,3,4,6,7,12,12b - octahydro - 12,12b - dimethylindolo-[2,3-$a$]quinolizine, having analgesic activity, is also described.

This application is a divisional and continuation-in-part of copending United States Patent Application, Ser. No. 38,913, filed May 19, 1970; which is a continuation-in-part of United States Patent Application, Ser. No. 889,-867, filed Dec. 22, 1969, now abandoned, which is a continuation-in-part of copending United States Patent Application, Ser. No. 839,629, filed July 7, 1969, now abandoned; which is a continuation-in-part of United States Patent Application, Ser. No. 632,105 filed Apr. 19, 1967, now abandoned; which is a continuation-in-part of United States Application, Ser. No. 536,076, filed Feb. 21, 1966, now abandoned; which is a continuation-in-part of United States Application, Ser. No. 428,842, filed Jan. 28, 1965, now abandoned.

This invention relates to indole derivatives having valuable pharmacological activity. More particularly, the invention relates to substituted 2,3,5,6,11,11b-hexahydro-1$\underline{H}$-indolizino[8,7-$b$]indoles and to 1,2,3,4,6,7,12,12b-octahydro-12,12b - dimethylindolo[2,3-$a$]quinolizine, which compounds demonstrate analgesic activity in standard pharmacological test procedures. Further, this invention is concerned with substituted 1,2,5,6,11,11b-hexahydro-3$\underline{H}$-indolizino[8,7-$b$]indol-3-ones and to 2,3,6,7,12,12b-hexahydro - 12,12b - dimethylindolo[2,3-$a$]quinolizine-4(1$\underline{H}$)-one, which compounds are useful for the production of the aforesaid analgesic compounds.

The 2,3,5,6,11,11b-hexahydro - 1$\underline{H}$ - indolizino[8,7-$b$] indole nucleus and the 1,2,3,4,6,7,12,12b-octahydro - 12,12b-dimethylindolo[2,3-$a$]quinolizine nucleus are depicted, respectively, in structural formulae A and B, wherein the numbering of the ring-system is shown:

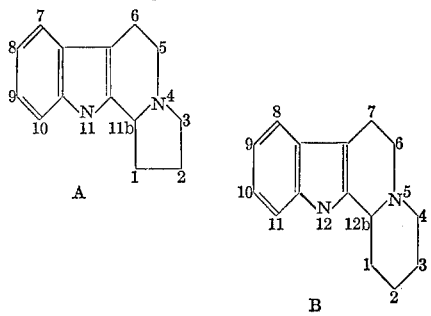

In its first aspect, the invention sought to be patented comprises analgesic compounds of the group consisting of:

(i) 2,3,5,6,11,11b-hexahydro-11,11b-dimethyl-1$\underline{H}$-indolizino[8,7-$b$]indole;
(ii) 11-ethyl-2,3,5,6,11,11b-hexahydro-11b-methyl-1$\underline{H}$-indolizino[8,7-$b$]indole;
(iii) 11b-ethyl-2,3,5,6,11,11b-hexahydro-11-methyl-1$\underline{H}$-indolizino[8,7-$b$]indole;
(iv) 2,3,5,6,11,11b-hexahydro-10,11,11b-trimethyl-$\underline{H}$-indolizino[8,7-$b$]indole;
(v) 8-fluoro-11,11b-dimethyl-2,3,5,6,11b-hexahydro-1$\underline{H}$-indolizino[8,7-$b$]indole;
(vi) 1,2,3,4,6,7,12,12b-octahydro-12,12b-dimethyl-indolo[2,3-$a$]quinolizine;
(vii) 2,3,5,6,11,11b-hexahydro-1,11,11b-trimethyl-1$\underline{H}$-indolizino[8,7-$b$]indole;
(viii) 2,3,5,6,11,11b-hexahydro-2,11,11b-trimethyl-1$\underline{H}$-indolizino[8,7-$b$]indole;
(ix) 2,3,5,6,11,11b-hexahydro 5,11,11b-trimethyl-1$\underline{H}$-indolizino[8,7-$b$]indole, the hydrochloride salt of which decomposes between 238° and 240.5° C. (uncorrected); and,
(x) 2,3,5,6,11,11b-hexahydro-6,11,11b-trimethyl-1$\underline{H}$-indolizino[8,7-$b$]indole, the hydrochloride salt of which decomposes between 227° and 228° C. (uncorrected);

and the non-toxic pharmaceutically acceptable acid addition salts thereof.

The aforesaid compounds [(i) to (x)] in the form of the non-toxic, acid-addition salts thereof with pharmacologically acceptable acids, may be prepared by dissolving the specific compound as the free base, which has been prepared by the methods described herein, in a suitable organic solvent, and treating it with an alcoholic solution of the selected acceptable acid, in accordance with conventional procedures for preparing acid-addition salts from base compounds generally. As such acids, there may be used any of hydrochloric, hydrobromic, tartaric, phosphoric, maleic, citric, acetic, benzoic, or other pharmacologically acceptable acid. Additionally, the optical isomers of the above-described compounds are obtained by conventional means; i.e. forming an acid addition salt with an optically active acid such as 2R:3R-tartaric acid which upon regeneration of the base using conventional means provides the dextro isomer. Using 2S:3S-tartaric acid with the remainder from the separation of dextro isomer provides the levo isomer which is isolated as the base by conventional means. The above separation can be avoided by the well-known procedure of using optically active starting materials to provide optically active final compounds.

In the pharmacological evaluation of the aforesaid compounds, i.e. the compounds denominated (i) to (x), the in vivo analgesic effects of the compounds are tested by a modification of the procedure of D'Amour and Smith, J. Pharmacol., 72:74 (1941), which is as follows:

Groups of from 5 to 10 male rats (1500–200 gms.) are placed in individual holders. The holders are placed so that a high intensity light beam shines on the tip of the tail. The intensity of the light beam is adjusted so that normal rats respond by moving their tails out of the light beam in 3 to 8 seconds. The average of two readings taken 20 minutes apart serves as a control. Rats are selected for testing whose control readings agree within one second. Compounds are administered orally or intraperitoneally and reaction times are measured every 20 minutes for two hours after drug-administration. Post drug reaction times are compared to the control average and are tested for statistical significance.

When tested according to the above-described procedure, the aforesaid compounds exhibit analgesic activity when administered orally, intraperitoneally or intramuscularly at a dosage range of about 3 to about 25 mg./kg. of body weight.

Of particular value as an analgesic agent is 2,3,5,6,11, 11b - hexahydro-11,11b-dimethyl-1H-indolizino[8,7-b]indole, hydrochloride, which when tested in the above-described test procedure shows an $ED_{50}$ of 4.5 mg./kg. (orally) and 2.9 mg./kg. (I.M.). "$ED_{50}$" is defined as the dose which produces a significant analgesic effect in 50% of the test animals. In the above-described test morphine exhibits an $ED_{50}$ of 12 mg./kg. (orally) and 1.8 mg./kg. (I.M.).

When the compounds of this invention are employed pharmaceutically; i.e. as analgesic agents, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, magnesium stearate, sugar, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In its second aspect, the invention sought to be patented comprises compounds of the group consisting of:

(xi) 1,2,5,6,11,11b-hexahydro-11,11b-dimethyl-3H-indolizino[8,7-b]indol-3-one;
(xii) 11-ethyl-1,2,5,6,11,11b-hexahydro-11b-methyl-3H-indolizino[8,7-b]indole-3-one;
(xii) 11b-ethyl-1,2,5,6,11,11b-hexahydro-11-methyl-3H-indolizino[8,7-b]indol-3-one;
(xiv) 1,2,5,6,11,11b-hexahydro-10,11,11b-trimethyl-3H-indolizino[8,7-b]indol-3-one;
(xv) 8-fluoro-1,2,5,6,11,11b-hexahydro-11,11b-dimethyl-3H-indolizino[8,7-b]-indol-3-one;
(xvi) 2,3,6,7,12,12b-hexahydro-12,12b-dimethyl-indolo-[2,3-a]quinolizin-4(1H)-one;
(xvii) 1,2,5,6,11,11b-hexahydro-1,11,11b-trimethyl-3H-indolizino[8,7-b]indol-3-one; and
(xviii) 1,2,5,6,11,11b-hexahydro-2,11,11b-trimethyl-3H-indolizino[8,7-b]indol-3-one.

The aforesaid compounds, i.e. the compounds denominated (xi) to (xviii), are useful as intermediates for the production of the analgesic compounds hereinbefore described. Those intermediate compounds which contain an $N_{ind}$-substituent can be converted directly to a final product by reaction with a reducing agent (whereby the lactam carbonyl is reduced) in a reaction-inert organic solvent under an inert atmosphere, e.g. lithium aluminum hydride in tetrahydrofuran under nitrogen, at about the reflux temperature of the mixture for a period of time ranging from about two to about ten hours.

Those compounds which do not contain an $N_{ind}$-substituent can be converted to a final product by either of two alternative routes:

In one method, the $N_{ind}$-position is first alkylated by reaction with an alkylating agent, such as a suitable alkyl halide or tosylate, in the presence of a base, such as sodium hydride, in a reaction inert organic solvent, at a temperature ranging from about 0° C. to about 100° C. The resulting compound is then reduced using the above-described reduction method.

In another method, the compound is first reduced using the above-described reduction method, and the resulting compound is alkylated at the $N_{ind}$-position using the above-described alkylation method.

The intermediate compounds of the invention in general can be prepared from known starting materials by methods known in the art, such as those described by S. Wawzonek and J. D. Nordstrom, *J. Med. Chem.*, 8, 265 (1965) or by F. Shiroyan et al. *Arm. Khim. Zh.* 20, 649 (1967).

In addition to the aforesaid utilities, 2,3,5,6,11,11b-hexahydro - 11,11b - dimethyl-1H-indolizino[8,7-b]indole and 1,2,5,6,11,11b - hexahydro-11,11b-dimethyl-3H-indolizino[8,7-b]indol-3-one, have utility in the production of 1,2,3,4,5,6,7,8 - octahydro - 3,7,8-trimethylazonino[5,4-b]indole, which possess useful diuretic activity. Methods of preparing and of using said diuretic compound are described in applicants' co-filed application entitled "Indole Fused Heterocyclic Diuretic Compound," designated by attorney's docket number AHP–3913–8–C8.

The best mode contemplated by the inventors for the manner and process of making the compounds of this invention are hereinafter described:

EXAMPLE I 1,2,3,5,6,11,11b-Hexahydro-11b-Methyl-3H-Indolizino[8,7-b]Indol-3-One

Tryptamine (112.15 g.), levulinic acid (97.6 g., 85.6 ml.) and butyl cellosolve (1 liter) are refluxed under nitrogen for sixteen hours and the solvent is removed. The residue is successively washed with water, dilute aqueous sodium hydroxide, water, dilute hydrochloric acid, water and dried. Trituration of the crude product, decomposition at 252–262° C., with methanol, and then with benzene, and drying provides 120.4 g. of the title compound, decomposition at 259–263° C.;

$\lambda_{max}^{KBr}$ 3.09, 6.01, 6.17, 13.38$\mu$.

In a similar manner, using the appropriate starting materials, is prepared 11b-ethyl-1,2,5,6,11,11b-hexahpdro-3H - indolizino[8,7 - b]indol - 3 - one, recrystallized from methylene chloride-ethanol folowed by methanol, m.p. 244–6° C. (softens 240° C.).

EXAMPLE II 1,2,5,6,11,11b-Hexahydro-11,11b-Dimethyl-3H-Indolizino[8,7-b]Indol-3-One A suspension of 4.81 g. 1,2,5,6,11,11b-hexahydro-11b-methyl-3H-indolizino[8,7-b]indol-3-one in 100 ml. dry dimethylformamide (DMF) is stirred under nitrogen with 1.06 g. of about 50% sodium hydride-mineral oil dispersion for 0.5 hour as hydrogen is evolved. The reaction solution is cooled in an ice-water bath as 3.41 g. methyl iodide (1.50 ml.) are added dropwise. After stirring for 0.5 hour at 0° C., the cooling bath is removed and the mixture is kept at about 25° for eighteen hours. After removal of solvent (*in vacuo*), the crude product is dissolved in chloroform, washed with water and dried with sodium sulfate ($Na_2SO_4$). The solvent is removed and the residue is chromatographically purified on a 250 g. column of neutral, activity III alumina. The product isolated from the 1:4 and 1:1 ether-benzene eluates is crystallized from carbon tetrachloride (twice) and from ethyl acetate to afford 2.63 g. of the title compound, m.p. 131.5–4.5° C.;

$\lambda_{max}^{KBr}$ 5.94$\mu$; $\lambda_{max}^{95\% EtOH}$ 226.5 ($\epsilon$ 34,100), 275 sh ($\epsilon$ 5,980), 282 ($\epsilon$ 6,360), 290 sh ($\epsilon$ 5,490) nm.; $\lambda_{min}^{95\% EtOH}$ 248 ($\epsilon$ 1,290) nm.;

NMR (CDCl$_3$):δ 1.58 (singlet, 11b-methyl), 3.68 (singlet, 11-methyl), 4.47 (multiplet, C–5 proton) p.p.m.

Analysis for C$_{16}$H$_{18}$N$_2$O.—Calculated: C, 75.56; H, 7.13; N, 11.02. Found: C, 75.51; H, 7.17; N, 11.16.

In a similar manner, using the appropriate starting materials, the following compounds are prepared:

11 - ethyl - 1,2,5,6,11,11b - hexahydro - 11b-methyl-3H-indolizino[8,7-b]indol-3-one; provided by alkylating with ethyl iodide and neutralized with glacial acetic acid prior to the removal of the dimethylformamide followed by extraction with ether and recrystallization from isopropylether, m.p. 124–127° C.;

11b - ethyl - 1,2,5,6,11,11b - hexahydro-11-methyl-3H-indolizino[8,7-b]indol-3-one; provided by alkylating with methyl iodide, the reaction mixture is neutralized with glacial acetic acid prior to the removal of the dimethylformamide, ether is the extraction solvent followed by recrystallization from isopropylether, m.p. 115–9° C.

EXAMPLE III 2,3,5,6,11,11b-Hexahydro-11,11b-Dimethyl-1H-Indolizino-[8,7-b]Indole, Hydrochloride To a suspension of 3.00 g. lithium aluminum hydride in 100 ml. dry tetrahydrofuran (THF), under nitrogen, is added a solution of 9.15 g. 1,2,5,6,11,11b-hexahydro-11,11b-dimethyl-3H-indolizino[8,7-b]indol-3-one in 100 ml. dry THF such that gentle reflux is maintained. Refluxing is continued for two hours after combining the reactants. The reaction mixture is cooled in an ice-water bath, treated *dropwise* with 16 ml. 3% w./v. aqueous sodium hydroxide, stirred 0.25 hour, filtered and the solids are thoroughly washed with boiling tetrahydrofuran. Removal of solvent from the filtrate and washings yields a residue which is dissolved in 100 ml. 2N hydrochloric acid and is washed with ether. The acidic solution is basified with 20 ml. concentrated ammonium hydroxide and the white precipitate is extracted into ether. After washing with water and with brine, the ethereal solution is dried (sodium sulfate) and freed of solvent. The crude base is chromatographically purified on a 400 g. column of neutral, activity III alumina to provide, from the 1:1 benzene-hexane eluates, 6.40 g. of 2,3,5,6,11,11b-hexahydro-11,11b-dimethyl-1H-indolizino[8,7-b]-indole, m.p. 65–68° C. Treatment of the base, in anhydrous ether, with excess isopropanolic hydrogen chloride affords a salt which is twice recrystallized from acetone, thus yielding the title compound, decomposition 226–8° C., $\lambda^{KBr}_{max.}$ 3.90, 4.12, 13.46$\mu$; $\lambda^{95\% \, EtOH}_{max.}$ 224 ($\epsilon$ 35,100), 274 sh ($\epsilon$ 6,780), 281 ($\epsilon$ 7,030), 291 sh ($\epsilon$ 5,650) nm.; $\lambda^{95\% \, EtOH}_{min.}$ 245 ($\epsilon$ 2,040) mn.;

NMR (CDCl$_3$):δ 2.13 (singlet, 11b-methyl), 3.81 (singlet, 11-methyl) p.p.m.

Analysis for C$_{16}$H$_{20}$N$_2$·HCl.—Calculated: C, 69.42; H, 7.65; Cl, 12.81; N, 10.12. Found: C, 69.43; H, 7.69; Cl, 13.04; N, 10.04.

The following 11,11b-disubstituted 2,3,5,6,11b-hexahydro-1H-indolizino[8,7-b]indole hydrochlorides are prepared in the preceding manner:

11 - ethyl - 2,3,5,6,11,11b - hexahydro-11b-methyl-1H-indolizino[8,7-b]indole, hydrochloride; recrystallized from acetone, decomposition 207–210° C.;

11b - ethyl - 2,3,5,6,11,11b - hexahydro-11-methyl-1H-indolizino[8,7-b]indole, mono maleate; prepared by combining the ethereal solutions of the base and maleic acid, recrystallized from ethyl acetate, decomposition 127.5–130.5° C.

EXAMPLE IV 2,3,5,6,11,11b-Hexahydro-11,11b-Dimethyl-1H-Indolizino[8,7-b]Indole

Dry dimethylformamide (30 ml.), 1.81 g. 2,3,5,6,11,11b-hexahydro-11b-methyl-1H indolizino[8,7-b]indole [S. Wawzonek and J. D. Nordstrom, *J. Med. Chem.*, 8, 265 (1965)] and 0.42 g. of about a 50% sodium hydride-mineral oil dispersion are stirred for one-half hour. The reaction mixture is cooled in an ice-water bath as 1.25 g. methyl iodide (0.55 ml.) in 3 ml. dry dimethylformamide are added dropwise. After stirring for 0.25 hour at 0° C., the mixture is kept at 25° C. for seven hours. Solvent is removed *in vacuo* and the residue, dissolved in ether, is washed with water, brine and dried (sodium sulfate). Distillation of the solvent and purification of the residue on 60 g. neutral, activity III alumina provide, from the 1:1 benzene-hexane eluates, a while solid. This amine is dissolved in 2N hydrochloric acid, washed with ether and the acidic solution is basified with concentrated ammonium hydroxide. The precipitated base is extracted into ether, washed with water, brine and dried (sodium sulfate). Removal of solvent yield 1.07 g. 2,3,5,6,11,11b-hexahydro - 11,11b - dimethyl - 1H - indolizino[8,7-b]-indole, m.p. 66.0–68.5° C.; which, by infrared, ultraviolet and nuclear magnetic resonance spectral comparisons, is identical with the base prepared by the procedure of Example III.

EXAMPLE V

Optical Isomers of 2,3,5,6,11,11b-Hexahydro-11,11b-Dimethyl-1H-Indolizino[8,7-b]Indole, Hydrochloride Dextro Isomer: A warm (50° C.) solution of 15.00 g. 2R:3R-tartaric acid, 0.10 mole [[$\alpha$]$_D^{24}$+12.7° (c. 19.95, H$_2$O)], in 600 ml. acetone is treated with a warm (50° C.) solution of 24.03 g. 2,3,5,6,11,11b-hexahydro-11,11b-dimethyl-1H-indolizino[8,7-b]indole (0.10 mole) in 40 ml. methanol. After seeding with the positive-rotating isomer, the solution is kept at about 25° C. for sixty-six hours. The cream-colored solid that separates is dried and thrice crystallized from acetonitrile to provide 8.95 g. d - 2,3,5,6,11,11b - hexahydro - 11,11b - dimethyl - 1H-indolizino[8,7-b]indole, 2R:3R-tartrate (mono): decomposition 156.0–158.5° C., [$\alpha$]$_D^{24}$+66.4° (c. 1.044, MeOH). A solution of 7.0 g. of the preceeding salt in 50 ml. of water is basified with aqueous sodium hydroxide and the base is extracted with toluene. The combined extracts are washed with water, with brine and dried (sodium sulfate). Removal of the solvent affords 4.1 g. base as a barely yellow oil, [$\alpha$]$_D^{25}$+99.1° (c. 0.982, MeOH). Dissolution of 3.93 g. base in 100 ml. anhydrous ether followed by addition of excess isopropanolic hydrogen chloride causes precipitation of a salt which is crystallized from dichloromethane-acetone. The 3.65 g. white, crystalline d - 2,3,5,6,11,11b - hexahydro - 11,11b - dimethyl-1H-indolizino[8,7-b]indole, hydrochloride thus isolated decompose at 247.5–249.5° C.; [$a$]$_D^{24}$+72.5° (c. 1.038, MeOH).

Levo Isomer: The acetone-methanol filtrate remaining after separation of the crude 2R:3R-tartrate is freed of solvent and the residue is dissolved in 250 ml. water. Basification of the brown solution with aqueous sodium hydroxide is followed by thorough extraction with toluene and the combined extracts are washed with water, with brine, dried (sodium sulfate) and freed of solvent. A solution of the residual brown gum in 25 ml. methanol is added to a warm (50° C.) solution of 8.96 g. 2S:3S-tartaric acid, 0.06 mole [[$\alpha$]$_D$—12.8° (c. 19.99, H$_2$O)], in 350 ml. acetone. After seeding with the negative rotating isomer, the solution is kept at 25° C. for sixteen hours. The solid that separates is dried and thrice crystallized from acetonitrile to yield 10.7 g. l-2,3,5,6,11,11b-hexahydro-11,11b-dimethyl-1H-indolizino[8,7-b]indole, 2S: 3S-tartrate (mono), decomposition 156.0–158.5° C., [$\alpha$]$_D^{24}$—66.7° (c. 1.035 MeOH). The salt (8.0 g.) is converted, in exactly the above manner, to 4.81 g. base, [$\alpha$]$_D^{25}$—96.3° (c. 0.963 MeOH) and then to 4.32 g. white, crystalline l-2,3,5,6,11,11b-hexahydro-11,11b-dimethyl - 1H - indolizino[8,7-b]indole, hydrochloride, decomposition 247.5–249.5° C., [$\alpha$]$_D^{25}$—72.3° (c. 1.059 MeOH).

EXAMPLE VI

1,2,5,6,11,11b-Hexahydro-10,11b-Dimethyl-3H-Indolizino[8,7-b]Indol-3-One

Condensation of 19.4 g. 7-methyltryptamine [(R. A. Abramovitch, *J. Chem. Soc. 1956*, 4593)] with 15.5 g. levulinic acid according to the procedure of Example I, trituration of the crude product with hexane, and drying give 27.6 g. of a solid. A 4.0 g. portion is twice crystallized from ethyl acetate to yield 1.72 g. of the title compound solvated with one-fourth molecule ethyl acetate per molecule of lactam, m.p. 228–236° C. (softens 215°);

$\lambda_{max.}^{KBr.}$ 3.16, 5.74, 6.02μ.

EXAMPLE VII

1,2,5,6,11,11b-Hexahydro-10,11,11b-Trimethyl-3H-Indolizino[8,7-b]Indol-3-One $N_{ind}$ methylation of 19.63 g. 1,2,5,6,11,11b-hexahydro-10,11b - dimethyl-3H-indolizino[8,7-b]indole-3-one with 4.44 g. *ca.* 50% sodium hydride-mineral oil dispersion and 13.13 g. (5.77 ml.) methyl iodide according to the directions of Example II yields a gum from the 1/9 chloroform-benzene and early 1/4 chloroform-benzene eluates while the later 1/4 and 1/1 chloroform-benzene eluates yield a solid. Rechromatography of the gum in the same manner gives 3.26 g. solid. The solid fractions are combined to afford 10.33 g. amide m.p. 158–164° C. (softens 150°). Two recrystallizations of a 3.5 g. portion from ethyl acetate yield 1.38 g. of the title compound, m.p. 167–169° C. (softens 164°).

EXAMPLE VIII

2,3,5,6,11,11b-Hexahydro-10,11,11b-Trimethyl-1H-Indolizino[8,7-b]Indole, Hydrochloride Following the direction of Example III, 6.71 g. of 1, 2,5,6,11,11b - hexahydro - 10,11,11b - trimethyl-3H-indolizino[8,7-b]indol-3-one are reduced with 1.90 g. lithium aluminum hydride to yield 4.59 g. of product, m.p. 143–146° C. (softens 135°). Dissolution of the base in ether and addition of excess isopropanolic hydrogen chloride give a salt which, after two recrystallizations from methylene chloride-acetone, yields 1.72 g. of the title compound, m.p. 225–226° C.

EXAMPLE IX

8-Fluoro-1,2,5,6,11,11b-Hexahydro-11b-Methyl-3H-Indolizino[8,7-b]Indole-3-One A solution of 21.47 g. 5-fluorotryptamine hydrochloride [E. Adlerova et al., *Coll. Czech. Chem. Commun.*, 25, 784 (1960)] in 100 ml. methanol is cooled in an ice-water bath and treated with 5.40 g. sodium methoxide. After ¼ hour, the methanol is removed, butyl Cellosolve (400 ml.) and levulinic acid (12.2 ml., 13.94 g.) are added and the mixture is heated with distillation of the volatiles until a reflux temperature of 168° C. is attained. Refluxing is continued for 18.5 hours and then the solvent is removed. Trituration of the residue with water, 1N hydrochloric acid, water 1N sodium hydroxide, water and thorough drying provide 17.3 g. solid, m.p. 231–5° C. (softens 220° C.). Two recrystallizations of a 3.00 g. portion from acetone-ethyl acetate afford 1.03 g. of the title compound, m.p. 241–2° C. (softens 238° C.).

EXAMPLE X

8-Fluoro-1,2,5,6,11,11b-Hexahydro-11,11b-Dimethyl-3H-Indolizino[8,7-b]Indol-3-One A solution of 8-fluoro-1,2,5,6,11,11b-hexahydro-11b-methyl-3H-indolizine[8,7-b]indol-3-one (14.84 g.) in 50 ml. dry dimethylformamide is stirred with 3.27 g. of about 50% sodium hydride-mineral oil dispersion for 0.5 hour and 9.64 g. (4.24 ml.) methyl iodide are added. After stirring for two hours, 4 ml. gl. acetic acid are added and the solvent is removed. The residue is triturated with hexane and then is dissolved in chloroform-water. Washing of the organic layer with water, drying and evaporation of solvent afford a gum which is chromatographed (twice) on neutral, activity III alumina. From the appropriate portions are isolated 10.15 g. title compound as a yellow gum, NMR (CDCl$_3$): δ 1.64 (singlet, 11b-methyl), 3.75 (singlet, 11-methyl) p.p.m.

EXAMPLE XI

8-Fluoro-11,11b-Dimethyl-2,3,5,6,11,11b-Hexahydro-1H-Indolizino[8,7-b]Indole, Hydrochloride Employing the conditions of Example III, 8-fluoro-1, 2,5,6,11,11b-hexahydro-11,11b-dimethyl - 3H - indolizino [8,7-b]indol-3-one (10.04 g.) is reacted with 2.94 g. of lithium aluminum hydride. An ethereal solution of the residue isolated from the tetrahydrofuran fractions is treated with excess isopropanolic hydrogen chloride. The salt thus formed is crystallized (twice) from dichloromethane-acetone to yield 4.48 g. of 8-fluoro-1,2,5,6,11, 11b-hexahydro - 11,11b - dimethyl-1H-indolizino[8,7-b] indole, hydrochloride, m.p. 250.5–252.0° C.

EXAMPLE XII

2,3,6,7,12,12b-Hexahydro-12,12b-Dimethylindolo[2,3-a]-Quinolizin-4(1H)-One

Alkylation of 2,3,6,7,12,12b-hexahydro-12b-methyl-indolo[2,3-a]quinolizin-4(1H)-one (14.1 g.) [F. R. Shiroyan, et al., *Arm. Khim. Zh.*, 20, 649 (1967)] in dry dimethylformamide (200 ml.) with a 50% sodium hydride mineral oil dispersion (3.21 g.) and methyl iodide (9.44 g.) by the procedure of Example II yields 12.4 g. of the title amide. Crystallization of a 2.3 g. portion from ethyl acetate gives 1.45 g. of the title compound, m.p. 113–114° C.

EXAMPLE XIII

1,2,3,4,6,7,12,12b-Octahydro-12,12b-Dimethylindolo [2,3-a]-Quinolizine (a) Lithium aluminum hydride (4.0 g.) and 10.1 g. 2,3,6,7,12,12b - hexahydro-12,12b-dimethylindolo[2,3-a] quinolizin-4(1H)-one are converted by the method of Example III into 6.2 g. of base, NMR (CLCl$_3$): δ 1.48 (singlet, 12b-methyl), 3.75 (singlet, 12-methyl) p.p.m. The salt, formed by treating an ethereal solution of the base with isopropanolic hydrogen chloride, is crystallized from acetone (twice) thereby giving 2.6 g. title compound, as the hydrochloride salt, decomposition 210–211° C.

(b) $N_{ind}$ methylation of 1.0 g. 1,2,3,4,6,7,12,12b-octahydro-12b-methylindolo[2,3-a]quinolizine [F. R. Shiroyan, et al., *Arm. Khim, Zh.*, 20, 649 (1967)] with 0.24 g. of about a 50% sodium hydride-mineral oil dispersion and 0.71 g. methyl iodide in the manner recorded in Example IV, using a two hour reaction period, afforded 500 mg. of base. Chromatographic purification of this material is conducted on two 20 x 20 mm. silica gel plates employing 6:3:1 dichloromethane-benzene-triethylamine as the developing system. Extraction of the appropriate sections with dichloromethane and removal of solvent from the extracts produce 300 mg. of gummy base. Based on NMR spectral data, this amine is identical to that prepared by the procedure of part (a) above.

EXAMPLE XIV

1,2,5,6,11,11b-Hexahydro-1,11b-Dimethyl-3H-Indolizino[8,7-b]Indol-3-One (a) Epimer A: Tryptamine hydrochloride (32.4 g.), 8.92 g. sodium methoxide, 400 ml. butyl Cellosolve and 25.8 g. 3-methyllevulinic acid [P. D. Rosenstock, *J. Hetero Chem.*, 3, 537 (1966)] are reacted in the manner of Example IX and the crude product is triturated successively with water, dil. aq. sodium hydroxide, water, dil. aq. hydrochloric acid, water and dried to afford 40.37 g. solid, m.p. 209–247° C. (softens 180° C.). Trituration (thrice) of the mixture of lactam with 200 ml. portions of acetone and recrystallization of the insolubles from methanol (twice) and from acetonitrile provide 6.08 g. of the title compound, Epimer A, m.p. 291–5° C., (softens 286°);

$\lambda_{max.}^{KBr.}$ 3.19, 6.01μ;

NMR (DMSO-$d_6$): δ 0.58 (doublet, J 7 Hz., 1-methyl), 1.56 (singlet, 11b-methyl) p.p.m.

(b) Epimer B: The acetone soluble material (23.86 g.) from the preceding experiment is chromatographed on 1 kg. neutral, activity III alumina and 6.46 g. crude lactam is isolated from the 1/9 and early 1/4 chloroform-ether eluates. The residue from the late 1/4 and 1/1 chloroform-ether eluates is rechromatographed in the same manner to provide 9.09 g. additional crude lactam. Recrystallization of the combined lots of lactam from ethyl acetate (twice) and from acetone (twice) yields 4.24 g. of the title compound, Epimer B, m.p. 231.5–234.0° C., $\lambda_{max.}^{KBr.}$ 3.02, 6.00μ;

NMR (DMSO-$d_6$): δ 1.38 (doublet, J 7 Hz., 1-methyl), 1.50 (singlet, 11b-methyl) p.p.m.

EXAMPLE XV 1,2,5,6,11,11b-Hexahyro-1,11,11b-Trimethyl-3$\underline{H}$-Indolizino[8,7-$b$]Indol-3-One (a) Epimer A: Employing a 1 hour reaction period and neutralization of the reaction mixture with 1 ml. gl. acetic acid, 11.41 g. 1,2,5,6,11,11b-hexahydro-1,11b-dimethyl-3$\underline{H}$-indolizino[8,7-$b$]indol-3-one, Epimer A, are methylated with 2.59 g. ca. 50% sodium hydride-mineral oil suspension and 7.69 g. (3.36 ml.) methyl iodide in the manner of Example X. The residue remaining after removal of the DMF is triturated with cold hexane, dissolved in ether, washed with water and dried (Na$_2$SO$_4$). Evaporation of solvent gives a yellow solid which is crystallized from methylene chloride-diisopropyl ether to give 8.84 g. cream colored amide. A 2.23 g. portion of this material is recrystallized (twice) from ethyl acetate thereby providing 1.29 g. of the title compound, Epimer A, m.p. 148.5–160° C., $\lambda_{max.}^{KBr.}$ 5.91μ;

NMR (CDCl$_3$): δ 0.70 (doublet, J 7 Hz., 1-methyl), 1.58 (singlet, 11b-methyl), 3.72 (singlet, 11-methyl) p.p.m.

(b) Epimer B: Methylation of 19.08 g. 1,2,5,6,11,11b-hexahydro-11,11b-dimethyl-3$\underline{H}$-indolizino[8,7-$b$]indol-3-one, Epimer B, with 4.34 g. ca. 50% sodium hydride-mineral oil dispersion and 12.75 g. (5.60 ml.) methyl iodide is carried out as in part (a). The crude product is chromatographed on 750 g. neutral, activity III alumina and the gums eluted with 1/9, 1/4 and 1/1 ether-benzene are combined an thoroughly dried to give 1.64 g. of the title compound, Epimer B, as a yellow glass-like solid, $\lambda_{max.}^{KBr.}$ 5.96μ;

NMR (CDCl$_3$): δ 1.40 (doublet, J 7 Hz., 1-methyl), 1.58 (singlet, 11b-methyl), 3.81 (singlet, 11-methyl) p.p.m.

EXAMPLE XVI 2,3,5,6,11,11b-Hexahydro-1,11,11b-Trimethyl-1$\underline{H}$-Indolizino[8,7-$b$]Indole, Hydrochloride (a) Epimer A: Reduction of 6.50 g. 1,2,5,6,11,11b-hexahydro-1,11,11b-trimethyl-3$\underline{H}$-indolizino[8,7 - $b$]indol-3-one, Epimer A, with 1.84 g. lithium aluminum hydride in the manner of Example III provides, from the 1/4, 7/13 and 1/1 benzene-hexane and benzene eluates, 3.47 g. yellow oily amine.

Treating an ethereal solution of the base with excess isopropanolic hydrogen chloride and recrystallization (twice) of the salt from acetone produces the title compound, Epimer A, m.p. 210.5–213.0° C. (softens 208°); NMR (CDCl$_3$): δ 0.93 (doublet, J 7 Hz., 1-methyl), 2.02 (singlet, 11b-methyl), 3.73 (singlet, 11-methyl) p.p.m.

(b) Epimer B: The reduction of 12.87 g. 1,2,5,6,11,11b-hexahydro-1,11,11b-trimethyl - 3$\underline{H}$ - indolizino[8,7 - $b$] indol-3-one, Epimer B, with 3.63 g. lithium aluminum hydride is conducted as described in part (a) and yields, from the 1:1 benzene-hexane and benzene eluates, 6.23 g. solid. Distillation of this material at 128°/3.10$^{-4}$ mm. gives 4.68 g. title compound, m.p. 116.5–118.0° C.

The amine, in ether, is exposed to excess isopropanolic hydrogen chloride and the salt thus formed is crystallized twice from acetone to afford 2.66 g. of the title compound, Epimer B, m.p. 233–4° C. (softens 232°); NMR (CDCl$_3$): δ 1.52 (doublet, J 7 Hz., 1-methyl), 2.00 (singlet, 11b-methyl), 3.77 (singlet, 11-methyl) p.p.m.

EXAMPLE XVII 1,2,5,6,11,11b-Hexahydro-2,11b-Dimethyl-3$\underline{H}$-Indolizino[8,7-$b$]Indol-3-One (a) Epimer A: Tryptamine hydrochloride (31.22 g.), 9.94 g. sodium methoxide and 29.06 g., 2-methyllevulinic acid [R. J. Reynolds Tobacco Co., C.A., 67, No. 32333, 3041, (1967); V. B. Piskov, C.A., 62, 13037b (1965)] and 300 ml. butyl Cellosolve are reacted as in Example IX. The reaction product is dissolved in methylene chloride, washed successively with water, dil. aq. sodium hydroxide, water, dil. aq. hydrochloric acid, water, and dried (Na$_2$SO$_4$). Evaporation of solvent and trituration of the residue with cold ether gives 32.96 g. solid (partially melting at 206.5°–208.0° with complete melting occurring at 226.0–227.5° C.) which is chromatographed on 1.5 kg. neutral, activity III alumina. Development of the column with ether and 1/9 chloroform-ether yields 21.7 g. solid, m.p. 196–207.5° C. while elution with 1/1 chloroform-ether provides 4.13 g. solid, m.p. 231–4° C. (softens 225°). The solid, m.p. 196–207.5° C., is triturated with cold ether thereby providing 15.71 g. lactam, m.p. 208.5–215° C. (softens 203°). A 2.6 g. portion of this material is recrystallized twice from ethyl acetate to afford 1.58 g. of title porduct, Epimer A, m.p. 219.5–221.5° C. (softens 214°);

$\lambda_{max.}^{KBr.}$ 3.06, 6.01μ;

NMR (DMSO-$d_6$): δ 1.15 (doublet, J 7 Hz., 2-methyl), 1.58 (singlet, 11b-methyl) p.p.m.

(b) Epimer B: Employing conditions of part (a), 25.32 g. tryptamine hydrochloride, 6.96 g. sodium methoxide and 20.14 g. 2-methyllevulinic acid are reacted in 400 ml. butyl Cellosolve to provide, after ether trituration of the thoroughly washed and dried reaction product, 25.72 g. buff solid, m.p. 233–237° C. Chromatographic purification of a 19.74 g. portion on 1 kg. neutral, activity III alumina yields from the late ether, 1/19, 1/9, 1/4, 1/1 ether-chloroform and chloroform eluates, 13.4 g. solid, m.p. 236.0–238.5° C. (softens 208°), which, upon crystallization from acetone affords 10.70 g. lactam, m.p. 242.5–243.5° C. (softens 220°). Two recrystallizations of 1.61 g. lactam from acetone provides 1.09 g. title compound, Epimer B, m.p. 242.5–244.0° C.) softens 238°);

$\lambda_{max.}^{KBr.}$ 3.15, 6.01μ;

NMR (DMSO-$d_6$): δ 1.05 (doublet, J 7 Hz., 2-methyl), 1.23 (doublet, J 7 Hz., 2-methyl), 1.55 (singlet, 11b-methyl), 1.61 (singlet, 11b-methyl) p.p.m.; possibly containing up to 19% Epimer A.

EXAMPLE XVIII 1,2,5,6,11,11b-Hexahydro-2,11,11b-Trimethyl-3$\underline{H}$-Indolizino[8,7-$b$]Indol-3-One (a) Epimer A: Methylation of 13.01 g. 1,2,5,6,11,11b-hexahydro - 2,11b - dimethyl-3$\underline{H}$-indolizino[8,7-$b$]indol-3-one, Epimer A, with 2.58 ca. 50% sodium hydride, mineral oil dispersion and 8.00 g. (3.51 ml.) methyl iodide is conducted as in Example X. From the 1/19, 1/9 and 1/4 ether-benzene eluates are isolated 9.63 g. title compound, m.p. 136–142° C. (softens 130°). A 2.5 g. quantity of amide is recrystallized (twice) from ethyl acetate thus yielding 1.45 g. of the title compound, Epimer A, m.p. 142.5–144.5° C. (soften 141°);

$\lambda_{max.}^{KBr.}$ 5.97µ;

NMR (CDCl₃): δ 1.35 (doublet, J 7 Hz., 2-methyl), 1.68 (singlet, 11b-methyl), 3.72 (singlet, 11-methyl) p.p.m.

(b) Epimer B: An 8.9 g. quantity of 1,2,5,6,11,11b-hexahydro - 2,11b - dimethyl-3H-indolizino[8,7-b]indol-3-one, Epimer B, is methylated with 1.77 g. ca. 50% sodium hydride-mineral oil dispersion and 5.46 g. (2.4 ml.) methyl iodide as in part (a). From the 1/19 and 1/9 ether-benzene eluates are isolated 7.12 g. amide, m.p. 152–7° C. (softens 145°). Two recrystallizations of a 1.3 g. portion of amide from methylene chloride-diisopropyl ether yield 0.99 g., of the title compound, Epimer B, m.p. 157.5–160.0° C. (softens 154°);

$\lambda_{max.}^{KBr.}$ 5.93µ;

NMR (CDCl₃): δ 1.18 (doublet, J 6 Hz., 2-methyl), 1.38 (doublet, J 7 Hz., 2-methyl), 1.62 (singlet, 11b-methyl), 1.67 (singlet, 11b-methyl), 3.75 (singlet, 11-methyl) p.p.m.; possibly containing up to 15% Epimer A.

EXAMPLE XIX 2,3,5,6,11,11b-Hexahydro-2,11,11b-Trimethyl-1H-Indolizino[8,7-b]Indole, Hydrochloride (a) Epimer A: Reduction of 7.05 g. 1,2,5,6,11,11b-hexahydro-2,11,11b - trimethyl - 3H - indolizino[8,7-b]indol-3-one, Epimer A, with 1.99 g. lithium aluminum hydride is conducted according to the directions of Example III. From the 1/4, 1/1 benzene-hexane, benzene and 1/9 ether-benzene eluates are isolated 4.90 g. oily amine.

The base (3.84 g.) in ether is treated with excess isopropanolic hydrogen chloride and the salt thus formed is recrystallized from acetone-ethyl acetate (twice) and from acetone to produce 2.24 g. of the title compound, Epimer A, m.p. 205–220° C.; NMR (CDCl₃): δ 1.20 (doublet, J 6 Hz., 2-methyl), 2.15 (singlet, 11b-methyl), 3.83 (singlet, 11-methyl) p.p.m.

(b) Epimer B: A 5.44 g. quantity of 1,2,5,6,11,11b-hexahydro - 2,11,11b - trimethyl - 3H-indolizino[8,7-b] indol-3-one, Epimer B is reduced with 1.53 g. lithium aluminum hydride following the directions of Example III. The 1/4 and 1/1 benzene-hexane and benzene eluates afford 4.04 g. oily amine which is converted to a salt with excess isopropanolic hydrogen chloride. Two recrystallizations of the crude salt from ethyl acetate-acetone provide 3.36 g. of the title compound, Epimer B, m.p. 230.5–233.5° C. (softens 227.5°); NMR (CDCl₃): δ 1.00 (doublet, J 5.5 Hz., 2-methyl), 1.20 (doublet, J 5.5 Hz., 2-methyl), 2.13 (singlet, 11b-methyl), 3.80 (singlet, 11-methyl) p.p.m.; possibly containing up to 19% of Epimer A.

EXAMPLE XX 1,2,5,6,11,11b-Hexahydro-5,11b-Dimethyl-3H-Indolizino[8,7-b]Indol-3-One (a) Epimer A: Condensation of 21.8 g. α-methyltryptamine with 17.42 g. (15.3 ml.) levulinic acid according to the method of Example I and thorough trituration of the reaction product with ether gives 23.06 g. buff-colored tetracyclic lactam, dec. 228–265° C. A 21.22 g. portion of the preceding product is extracted twice with 200 ml. portions of acetone and the insolubles are twice recrystallized from acetone to provide 8.84 g. white crystalline title compound, m.p. 280–283° C.;

$\lambda_{max.}^{KBr.}$ 3.04, 5.82 shoulder, 5.98µ;

NMR (DMSO-d₆): δ 1.58 (singlet, 11b-methyl), 1.78 (doublet, J 7 Hz., C–5-methyl), 3.68 (multiplet, C–5 proton) p.p.m. Comparison of the above NMR spectrum with that of part (b) below and with that of Example II indicates that Epimer A is the isomer in which the amide carbonyl and the C–5 methyl group are coplanar.

(b) Mixture of C–5 Epimers: The solids (6.5 g.) isolated from the acetone extracts (400 ml.) in part (a) are dissolved in chloroform and are passed through a 200 g. column of neutral, activity III alumina. Crystallization of the solid eluted with chloroform from acetonitrile (thrice) and from acetone (twice) yields 1.99 g. white crystals melting 231–242° C. (softens 228°);

$\lambda_{max.}^{KBr.}$ 3.06, 5.97, 6.01µ;

NMR (DMSO-d₆): δ 1.18 (doublet, J 7 Hz., C–5 methyl), 1.58 (singlet, 11b-methyl), 1.63 (singlet, 11b-methyl), 1.78 (doublet, J 7 Hz., C–5 methyl), 3.68 (multiplet, 5-proton), 4.80 (multiplet, 5-proton) p.p.m. These NMR data indicate that the product (m.p. 231–242° C.) is a mixture of C–5 epimers.

EXAMPLE XXI 1,2,5,6,11,11b-Hexahydro-5,11,11b-Trimethyl-3H-Indolizino[8,7-b]Indol-3-One (a) Epimer A: Using the method of Example II, 30.52 g. 1,2,5,6,11,11b-hexahydro - 5,11b - dimethyl-3H-indolizino[8,7-b]indol-3-one, Epimer A, are methylated with 6.91 g. ca. 50% sodium hydride-mineral oil dispersion and 20.42 g. (9.0 ml.) methyl iodide. After a 3.5 hour reaction period, the mixture is neutralized with 5 ml. glacial acetic acid. Elution of the chromatography column with 1/4 and 1/1 ether-benzene affords 22.36 g. cream-colored amide, m.p. 110–115° C. Two recrystallizations (diisopropyl ether) of a 4.80 g. portion of the preceding product yield 3.98 g. of the title product, Epimer A, m.p. 111–4° C.;

$\lambda_{max.}^{KBr.}$ 5.95µ;

NMR (CDCl₃): δ 1.63 (singlet, 11b-methyl), 1.98 (doublet, J 7 Hz., 5-methyl), 3.67 (singlet over multiplet pattern, overlapping 11-methyl and 5-proton absorptions) p.p.m.

(b) Epimer B: Employing the procedure of Example II, 31.14 g. 1,2,5,6,11,11b-hexahydro-5,11b-dimethyl-3H-indolizino[8,7-b]indol-3-one (ca. 2/1 mixture C–5 epimers, melting 228–252° C.) are methylated with 7.04 g. ca. 50% sodium hydride-mineral oil suspension and 20.84 g. (9.16 ml.) methyl iodide. After a 1 hour reaction period, the mixture is neutralized with 3 ml. glacial acetic acid. The crude product is chromatographed on 1.35 kg. neutral, activity III alumina. Development of the column with ether and with 1/9 methylene chloride-ether gives 6.0 g. amide which is rechromatographed in the same manner to provide 1.64 g., white solid, m.p. 138–140° C. Elution of the first column with 1/4 and 1/1 methylene chloride-ether and with methylene chloride yields a solid which, upon recrystallization from diisopropyl ether-acetone affords 10.44 g. lactam, m.p. 138–142° C. The two solids (m.p. 138–140° C. and 138–142° C.) are combined and recrystallized from diisopropyl ether-acetone thus producing 10.66 g. white solid, m.p. 139.5–142.0° C. (softens 132°). An additional crystallization of a 2.5 g. portion in the same manner provides 1.81 g. of the title compound, Epimer B, m.p. 141–3° C. (softens 132°);

$\lambda_{max.}^{KBr.}$ 5.96µ;

NMR (CDCl₃): δ 1.29 (doublet, J 7 Hz., 5-methyl), 1.73 (singlet, 11b-methyl), 3.75 (singlet, 11-methyl), 5.00 (multiplet, 5-proton) p.p.m.

EXAMPLE XXII 2,3,5,6,11,11b-Hexahydro-5,11,11b-Trimethyl-1H-Indolizino[8,7-b]Indole Hydrochloride (a) Epimer A: In a manner similar to that of Example III, 17.44 g. 1,2,3,5,6,11,11b-hexahydro-5,11,11b-trimethyl-3H-indolizino[8,7-b]indol-3-one, Epimer A, are reduced with 4.94 g. lithium aluminum hydride. From the 1/1 benzene-hexane and benzene eluates are isolated 13.13 g. base as a yellow oil; NMR (CDCl$_3$): δ 1.35 (doublet, J 7 Hz., 5-methyl), 1.54 (singlet, 11b-methyl), 3.67 (singlet, 11-methyl) p.p.m.

Treating an ethereal solution of the amine with excess isopropanolic hydrogen chloride and crystallizing (twice) the salt from acetone-methylene chloride provide 10.20 g. of the title compound, Epimer A, as off-white crystals, dec. 270–3° C.; NMR (CDCl$_3$): δ 1.77 (doublet, J 7 Hz., 5-methyl), 2.17 (singlet, 11b-methyl), 3.78 (singlet above a weak multiplet pattern, 11-methyl) p.p.m.

(b) Epimer B: Reducing 8.06 g. 1,2,5,6,11,11b-hexahydro-5,11,11b-trimethyl-3H-indolizino[8,7 - b]indol - 3-one, Epimer B, with 2.28 g. lithium aluminum hydride in the manner recorded in Example III gives, from the 1/1 benzene-hexane and benzene eluates, 5.52 g. amine as a pale-yellow, viscous oil; NMR (CDCl$_3$): δ 1.27 (doublet, J 7 Hz., 5-methyl), 1.63 (singlet, 11b-methyl), 3.75 (11-methyl) p.p.m.

Addition of excess isopropanolic hydrogen chloride to an ethereal solution of the base produces a solid which, upon recrystallization from acetone and from methylene chloride-actone affords 2.56 g. of the title compound, Epimer B, dec. 238.0–240.5° C.; NMR (CDCl$_3$): δ 1.70 (doublet, J 7 Hz., 5-methyl), 2.22 (singlet, 11b-methyl), 3.80 (singlet over weak multiplet pattern, 11-methyl) p.p.m.

EXAMPLE XXIII 1,2,5,6,11,11b-Hexahydro-6,11,11b-Trimethyl-3H-Indolizino[8,7-b]Indol-3-One (a) α,1-Dimethylindole-3 - Acetonitrile: Sodium hydride (9.60 g. of ca. 50% dispersion in mineral oil) is washed (thrice, under nitrogen) with 50 ml. portions of dry hexane and suspended in 100 ml. dry dimethylformamide (DMF). A solution of 34.04 g. 1-methylindole-3-acetonitrile [H. R. Snyder and E. L. Eliel, *J. Am. Chem. Soc.* 70, 1703 (1948)] in 30 ml. dry DMF is added with stirring during 10 minutes keeping the reaction temperature at ca. 25° C. After an additional 40 minutes of stirring, 28.4 g. (12.5 ml.) methyl iodide in 25 ml. dry DMF are added during 20 minutes while maintaining the reaction temperature at ca. 10° C. Following a ½ hour reaction period, 2 ml. glacial acetic acid are added and the solvent is removed. The residue is dissolved in ether and the ethereal solution is washed with water, with brine and dried (Na$_2$SO$_4$). Removal of solvent yields 34.6 g. brown oil which was distilled. The fractions boiling at 135–153° C./0.05–0.15 mm., 32.41 g., were combined and chromatographed on 1 kg. neutral, activity III alumina. The solids eluted with 1/1 benzene-hexane and with benzene were combined and twice recrystallized from diisopropyl ether to afford 10.54 g. cream-colored solid, m.p. 59.0–62.5° C. A 3.00 g. portion of this material was distilled to yield 2.47 g. α,1-dimethylindole-3-acetonitrile, b.p. 135–7° C./0.05 mm. as a pale yellow liquid which crystallized to a white solid, m.p. 59–63° C.; NMR (CDCl$_3$): δ 1.70 (doublet, J 7 Hz., α-methyl), 3.70 (single, 1-methyl) p.p.m.

(b) 3-(2 - Amino-1-Methylethyl)-1-methylindole, hydrochloride: A solution of 7.27 g. α,1 - dimethylindole-3-acetonitrile in 150 ml. dry ether is added during 20 min. to a refluxing suspension of 3.04 g. lithium aluminum hydride in 100 ml. dry ether. Following 3 hours of refluxing, the reaction mixture is decomposed carefully with 25 ml. N sodium hydroxide. The reaction mass is filtered and the insolubles are thoroughly extracted with ether. Washing of the combined organic fractions with water, with brine, drying (Na$_2$SO$_4$) and removal of solvent produce 6.90 g. oil which is dissolved in dil. aq. hydrochloric acid. The acidic solution is washed with ether, basified with excess aqueous sodium hydroxide and the base is extracted into ether, washed with water, with brine and dried (Na$_2$SO$_4$). Evaporation of the ether provides 6.40 g. yellow, oily amine which is converted to a salt by treating an ethereal solution with excess isopropanolic hydrogen chloride. Recrystallization of the salt from ethanol-isopropanol and from ethanol yields 4.27 g. 3-(2-amino-1-methylethyl)-1-methylindole, m.p. 234.5–236.5° C.; NMR (DMSO-d$_6$): δ 1.41 (doublet, J 7 Hz., α-methyl), 3.77 (singlet, 1-methyl) p.p.m.

(c) 5-Hydroxy-5-Methyl-1-[2-(1-Methylindol - 3 - yl) Propyl]-2-Pyrrolidinone and N-[2-(1-Methylindol-3-yl)Propyl]-4-Oxovaleramide Angelica lactone (43.5 g.) 76.1 g. 3-(2-amino-1-methylethyl)-1-methylindole and 750 ml. benzene are refluxed for 3 hours. The reaction solution is diluted with 500 ml. ether, washed with water, dil. aq. hydrochloric acid, water, dil. aq. sodium hydroxide, water and dried (Na$_2$SO$_4$). Removal of solvent produces a yellow gum which solidifies after trituration (twice) with 250 ml. ether and the solid is recrystallized from ethyl acetate to provide 21.14 g. pale-yellow solid, m.p. 126–131° C. Two recrystallization of a 10 g. portion of this material from acetone yield 4.76 g. off-white 5-hydroxy-5-methyl-1-[2-(1-methylindol-3-yl)propyl] - 2 - pyrrolidinone (cyclic tautomer), m.p. 131–7° C.;

$\lambda_{max}^{KBr}$ 3.12, 6.04μ.

The ether and ethyl acetate mother liquors are combined and freed of solvent to provide 82.8 g. brown, gummy N-[2-(1-methylindol-3-yl)propyl] - 4 - oxovaleramide (open tautomer);

$\lambda_{max}^{film}$ 3.00, 5.81, 6.00μ.

(d) Epimer A: A solution of the open and cyclic tautomers (99.00 g.), as prepared in part (c), 1 liter methanol and 50 ml. 11.7 N hydrochloric acid are kept at ca. 25° C. for 15 hours. Dissolution of the brown oil remaining after removal of solvent in 500 ml. methylene chloride, thorough washing with water, drying (Na$_2$SO$_4$) and evaporation of solvent give a gummy, brown solid which is triturated (twice) with ether. The buff solid thus formed is recrystallized from methylene chloride-diisopropyl ether and from ethyl acetate (twice) to yield 29.03 g. cream-colored lactam, m.p. 180.3° C. An additional crystallization of a 5.00 g. portion from ethyl acetate affords 3.93 g. of the title compound, Epimer A, m.p. 181–4° C.;

$\lambda_{max}^{KBr}$ 5.90μ;

NMR (CDCl$_3$): δ 1.25 (doublet, J 7 Hz., 6-methyl), 1.58 (singlet, 11b-methyl), 3.70 (singlet, 11-methyl) p.p.m.

(e) Mixture of C–6 Epimers: The residue from the ether, diisopropyl ether, methylene chloride and ethyl acetate mother liquors of part (d) are combined in 300 ml. acetone and treated with 1 g. charcoal. Filtration and removal of solvent yield a yellow-brown foam which, upon treatment with ethyl acetate, provides 14.6 buff solid. Two crystallizations of 2.5 g. of this solid from acetone-heptane yield 1.85 g. of the title compound as a mixture of C–6 epimers, m.p. 139–142° C.;

$\lambda_{max}^{KBr}$ 5.90μ;

NMR (CDCl$_3$): δ 1.25 (doublet, J 6.5 Hz., 6-methyl), 1.45 (doublet, J 6.5 Hz., 6-methyl), 1.58 (singlet, 11b-methyl), 1.65 (singlet, 11b-methyl), 3.73 (singlet, 11-methyl) p.p.m.

EXAMPLE XXIV 2,3,5,6,11,11b-Hexahydro-6,11,11b-Trimethyl-1H-Indolizino[8,7-b]Indole, Hydrochloride (a) Epimer A: Reduction of 13.42 g. 1,2,5,6,11,11b-hexahydro-6,11,11b-trimethyl - 3H - indolizino[8,7-b]indol-3-one, Epimer A, with 3.79 g. lithium aluminum hydride is conducted in the manner of Example III. The residue from the THF fractions is dissolved in ether, washed with water and dried (Na$_2$SO$_4$). Evaporation of the ether gives 12.3 g. white solid which is chromatographically purified on 500 g. neutral, activity III alumina. From the 1/1 hexane-benzene and benzene eluates are isolated 10.1 g. off-white solid amine, m.p. 109–111° C.

An ethereal solution of this base (9.95 g.) is treated with excess isopropanolic hydrogen chloride. Recrystallization (thrice) of the salt, thus formed, from methylene chloride-acetone produces 5.13 g. of the title compound, Epimer A, as the hemi-hydrate, dec. 216.5–219.0° C.; NMR (CDCl$_3$): δ 1.55 (doublet, J 6 Hz., 6-methyl), 1.98 (singlet, 11b-methyl), 3.73 (singlet, 11-methyl) p.p.m.

(b) Epimer B: Reduction of 13.5 g. 1,2,5,6,11,11b-hexahydro-6,11,11b-trimethyl - 3H - indolizino[8,7-b]indol-3-one (mixture of C–6 epimers) with 3.79 g. lithium aluminum hydride as in the part (a) yields 12.6 g. brown gum which is chromatographed on 500 g. neutral, activity III alumina. Elution with 1/1 hexane-benzene gives a 8.4 g. gum which is dissolved in ether and is converted to a mixture of salts with excess isopropanolic hydrogen chloride. The salts are extracted (thrice) with 100 ml. portions of boiling THF and evaporation of solvent from the combined extracts yields 3.68 g. solid. Crystallization of the solid from 1,2-dimethoxyethane affords 2.12 g. brown crystals, dec. 208–218° C. (softens 190°). This crystalline material is extracted with ca. 125 ml. boiling THF and the insoluble fraction (0.78 g.) is recrystallized twice from acetone to yield 0.27 g. title compound, Epimer B, dec. 227–8° C. (softens 223°); NMR (CDCl$_3$): δ 1.53 (doublet, J 6 Hz., 6-methyl) 2.15 (singlet, 11b-methyl), 3.80 (singlet, 11-methyl) p.p.m.

EXAMPLE XXV 2,3,5,6,11,11b-Hexahydro-11b-Methyl-1H-Indolizino [8,7-b]Indole (a) 2 - Carboxy-2-Methyl-1-Pyrrolidinebutyric Acid, Dimethyl Ester: Acetone (300 ml.), 17.1 g. dl 2-methyl-2-pyrrolidine-carboxylic acid, methyl ester, 16.5 g. anhydrous potassium carbonate, 18.0 g. methyl 4-chlorobutyrate and 19.5 g. anhydrous sodium iodide are stirred and refluxed for 48 hours. The reaction mixture is filtered and the filtrates are freed of solvent. Suspension of the residue in ether, filtration and evaporation of ether from the filtrate gives a residue which is distilled to provide 14.0 g. dimethyl ester, b.p. 105–8° C./0.1 mm.

Analysis for C$_{13}$H$_{21}$NO$_6$.—Calculated: C, 59.24; H, 8.70; N, 5.76. Found: C, 59.61; H, 8.62; N, 5.76.

(b) 1,2,3,5,6,8a-Hexahydro-8a-Methylindolizin-8(7H)-One: Toluene (200 ml.), 4.1 g. sodium methoxide and 16.0 g. 2-carboxy-2-methyl-1-pyrrolidinebutyric acid, dimethyl ester are refluxed three hours. The mixture is extracted with water and the combined aqueous extracts are adjusted pH 1 with conc. hydrochloric acid. After heating three hours at ca. 100° C., the acidic solution gives a positive ferric chloride test. Therefore, heating is continued 10 hours longer whereupon a negative test is attained. The solution is evaporated to a small volume and treated with excess sodium carbonate. The ether phase is separated and the residue is triturated thoroughly with ether. After drying (MgSO$_4$), the combined ethereal fractions are freed of solvent and the residual oil is distilled to afford 4.4 g. 1,2,3,5,6,8a-hexahydro-8a-methylindolizin - 8(7H) - one, b.p. 115–9° C./22 mm.;

$\lambda_{max.}^{film}$ 5.83μ;

NMR (CDCl$_3$): δ 0.95 (singlet, 8a-methyl) p.p.m.

(c) Phenylhydrazine (1.2 g.), 1.5 g. 1,2,3,5,6,8a-hexahydro-8a-methyl-indolizin18(7H)-one, 6 ml. conc. hydrochloric acid and 6 ml. water are refluxed one hour. Dilution of the acidic solution with water is followed by washing with ether. The aqueous solution is made strongly basic and is extracted with ether. After washing with brine, the ethereal extracts are dried (MgSO$_4$) and freed of solvent. Crystallization of the residue from cyclohexane provides 1.7 g. solid, m.p. 105–110° C. Passing this material through a 30 g. column of neutral, activity III alumina provides, from the benzene eluates, 1.2 g. solid which is crystallized from hexane (under nitrogen). Based upon melting point behavior and IR, UV, and NMR spectral data, the resulting solid, m.p. 116–7° C., is identical with a specimen of title compound prepared by the lithium aluminum hydride reduction of 1,2,5,6,11,11b-hexahydro-11b-methyl-3H-indolizino[8,7-b]indol - 3 - one [S. Wawzonek and J. D. Nordstrom, *J. Med. Chem.*, 8, 265 (1965)].

EXAMPLE XXVI 1,2,5,6,11,11b-Hexahydro-11b-Methyl-3H-Indolizino [8,7-b]Indol-3-Thione Phosphorus pentasulfide (13.34 g.), 14.42 g. 1,2,5,6,11,11b-hexahydro-11b-methyl-3H-indolizino[8,7-b]indol-3-one [S. Wawzonek and J. D. Nordstrom. *J. Med. Chem.*, 8, 265 (1965)] and 200 ml. 1,2-dimethoxyethane are refluxed 3 hours and the reaction solution is diluted with 800 ml. methylene chloride, thoroughly washed with dil. aq. ammonium hydroxide, with water and solvent is removed. Chromatographic purification of the residue on a 500 g. column of neutral, activity III alumina provides, from the 1/1 benzene-chloroform eluates, 6.49 g. buff solid, dec. 208–213° C. Two recrystallizations (ethyl acetate) of a 4.00 g. aliquot yield 2.60 g. white, crystalline title thione, dec. 211.5–213.0° C.;

$\lambda_{max.}^{95\% \text{ EtOH}}$ 221.5 (ε 37,850), 269 (ε 26,500), 287 sh (ε 14,040) nm; $\lambda_{min.}^{95\% \text{ EtOH}}$ 237 (ε 4,040) nm.

EXAMPLE XXVII 1,2,5,6,11,11b-Hexahydro-11,11b-Dimethyl-3H-Indolizino[8,7-b]Indol-3-Thione (a) Employing the procedure of Example XXVI, 15.26 g. 1,2,5,6,11,11b - hexahydro - 11,11b - dimethyl - 3H-indolizino[8,7-b]indol-3-one, 13.34 g. phosphorus pentasulfide and 200 ml. 1,2-dimethoxyethane are reacted to produce, from the benzene and 1/9 ether-benzene eluates, 10.10 g. buff foam. Crystallization of the crude product from carbon tetrachloride (twice) and from methylene chloride-heptane (twice) affords 4.46 g. title thione as a buff solid, m.p. 133–6° C.

$\lambda_{max.}^{95\% \text{ EtOH}}$ 223.5 (ε 36,950), 270.5 (ε 25,500) nm; $\lambda_{min.}^{95\% \text{ EtOH}}$ 239 (ε 5,640) nm.

(b) Methylating 1.28 g. 1,2,5,6,11,11b-hexahydro-11b-methyl-3H-indolizino[8,7-b]indol-3-thione (with 0.26 g. ca. 50% sodium hydride-mineral oil suspension and 0.78 g. (0.34 ml.) methyl iodide and 25 ml. DMF according to the method of Example II with neutralization of the reaction mixture with 0.5 ml. glacial acetic acid and employing benzene as the extraction solvent provides 1.02 g. gummy product. This gum is chromatographically purified on a 50 g. column of neutral, activity III alumina and the material eluted with benzene and 1/9 ether-benzene is recrystallized (twice) from methylene chloride-heptane to give 0.46 of the title compound, m.p. 132–4° C. exhibiting infrared, ultraviolet and NMR spectral data identical with those of the product of part (a).

EXAMPLE XXVIII 2,3,5,6,11,11b-Hexahydro-11,11b-Dimethyl - 1H - Indolizino[8,7-b]Indole Refluxing 1.08 g. 1,2,5,6,11,11b-hexahydro-11,11b-dimethyl-3H-indolizino[8,7-b]indol-3-thione in 100 ml. absolute ethanol with 12 g. (wet wt.) of Raney nickel (Grace Co. No. 28, previously slurried with distilled water and then with absolute ethanol) for 1.5 hours (under nitrogen) is followed by filtration and thorough washing of the insolubles with chloroform. The combined organic fractions are freed of solvent and the residue is dissolved in dil. aq. hydrochloric acid and washed with ether. Basification of the acidic solution with aq. sodium hydroxide, extraction of the crude product into ether, thorough washing of the ethereal extracts with water, drying (Na₂SO₄) and removal of ether provide 0.78 g. white solid, m.p. 59–64° C. Purification of the solid on a 35 g. column of neutral, activity III alumina yields, from the benzene eluates, 0.64 g. of the title base, m.p. 65.0–67.5° C. The infrared, ultraviolet and NMR spectra of this product are identical with those of the base produced by the method of Example III.

The procedure of Examples XXVII and XXVIII are similar to those described in U.S. Pat. 3,454,583, issued to M. E. Kuehne.

What is claimed is:

1. 2,3,5,6,11,11b-hexahydro - 11,11b - dimethyl-1H-indolizino[8,7-*b*]indole and the pharmaceutically acceptable non-toxic acid addition salts thereof.

2. A compound as defined in Claim 1 which is: 2,3,5,6,11,11b-hexahydro-11,11b - dimethyl - 1H - indolizino[8,7-*b*]indole, hydrochloride.

3. A compound as defined in Claim 1 which is: *d*-2,3,5,6,11,11b-hexahydro-11,11b-dimethyl - 1H - indolizino[8,7-*b*]indole.

4. A compound as defined in Claim 1 which is: *d*-2,3,5,6,11,11b-hexahydro-11,11b-dimethyl - 1H - indolizino[8,7-*b*]indole, hydrochloride.

5. 11-ethyl-2,3,5,6,11,11b-hexahydro - 11b-methyl-1H-indolizino[8,7-*b*]indole, and the non-toxic pharmaceutically acceptable acid addition salts thereof.

6. 11b-ethyl-2,3,5,6,11,11b-hexahydro-11-methyl - 1H-indolizino[8,7-*b*]indole, and the non-toxic pharmaceutically acceptable acid addition salts thereof.

7. 2,3,5,6,11,11b-hexahydro-10,11,11b-trimethyl - 1H-indolizino[8,7-*b*]indole, and the non-toxic pharmaceutically acceptable acid addition salts thereof.

8. 8-fluoro-11,11b-dimethyl-2,3,5,6,11,11b - hexahydro-1H - indolizino[8,7-*b*]indole, and the non-toxic pharmaceutically acceptable acid addition salts thereof.

9. 1,2,3,4,6,7,12,12b-octahydro-12,12b - dimethylindo-[2,3-*a*]quinolizine and the non-toxic pharmaceutically acceptable acid addition salts thereof.

10. 2,3,5,6,11,11b-hexahydro-1,11,11b-trimethyl - 1H-indolizino[8,7-*b*]indole, and the non-toxic pharmaceutically acceptable acid addition salts thereof.

11. 2,3,5,6,11,11b - hexahydro - 2,11,11b-trimethyl-1H-indolizino[8,7-*b*]indole, and the non-toxic pharmaceutically acceptable acid addition salts thereof.

12. 2,3,5,6,11,11b-hexahydro-5,11,11b-trimethyl - 1H-indolizino[8,7-*b*]indole, the hydrochloride salt of which decomposes between 238° and 240.5° C. (uncorrected).

13. 2,3,5,6,11,11b-hexahydro-6,11,11b-trimethyl - 1H-indolizino[8,7-*b*]indole, the hydrochloride acid salt of which decomposes between 227° and 228° C. (uncorrected).

References Cited

UNITED STATES PATENTS 3,478,051  11/1969  Houlihan et al. _____ 260—326.12

FOREIGN PATENTS 638,408  4/1964  Belgium _____ 260—293

OTHER REFERENCES

Wawzonek et al; J. Med. Chem. *8* (2), 265—7 (1965).
Herbst et al.: J. Med. Chem. *9* (6), 864–8 (1966).
Gootjes et al.: Rec. Trav. Chim. *80*, 1223–8 (1961).
Shiroyan et al.: Arm. Khim. Zh. *21*, 44–50 (1968); Chem. Abstracts.
Shiroyan et al.: Arm. Khim. Zm. *21*, 1025–33 (1968); Chem. Abstracts.

G. THOMAS TODD, Primary Examiner

U.S. Cl. X.R.

260—295 A, 296 P; 424—263, 267